United States Patent
Brown et al.

[11] Patent Number: 5,911,431
[45] Date of Patent: Jun. 15, 1999

[54] CONSUMER ASSEMBLED STROLLER FRONT WHEEL ASSEMBLY

[75] Inventors: Bryan M. Brown, Buffalo; Brian L. Badger, Amherst, both of N.Y.

[73] Assignee: Fisher-Price, Inc., East Aurora, N.Y.

[21] Appl. No.: 08/784,813

[22] Filed: Jan. 16, 1997

[51] Int. Cl.[6] .............................. B62B 7/06; B62B 7/10
[52] U.S. Cl. .................. 280/642; 280/650; 280/47.38
[58] Field of Search ................... 280/650, 642, 280/644, 647, 649, 658, 657, 47.38; 403/329

[56] References Cited

U.S. PATENT DOCUMENTS

| | | | |
|---|---|---|---|
| 3,116,069 | 12/1963 | Dostal | 280/30 |
| 3,504,925 | 4/1970 | Glaser | 280/36 |
| 3,871,783 | 3/1975 | Vogler . | |
| 4,643,446 | 2/1987 | Murphy et al. | 280/648 |
| 4,763,911 | 8/1988 | Gebhard et al. | 280/37 |
| 4,768,795 | 9/1988 | Mar | 280/30 |
| 4,813,693 | 3/1989 | Lockard et al. | 280/42 |
| 4,903,980 | 2/1990 | Schwartz | 280/647 |
| 4,934,728 | 6/1990 | Chen | 280/644 |
| 4,953,880 | 9/1990 | Sudakoff et al. | 280/47.38 |
| 4,993,743 | 2/1991 | Takahashi et al. | 280/642 |
| 5,112,069 | 5/1992 | Aldus et al. | 280/42 |
| 5,123,670 | 6/1992 | Chen | 280/650 |
| 5,181,735 | 1/1993 | Onishi | 280/642 |
| 5,188,389 | 2/1993 | Baechler et al. | 280/650 |
| 5,197,753 | 3/1993 | Liu | 280/642 |
| 5,234,226 | 8/1993 | Liu | 280/642 |
| 5,301,963 | 4/1994 | Chen | 280/30 |
| 5,356,160 | 10/1994 | Urlwin | 280/30 |
| 5,356,171 | 10/1994 | Schmidlin et al. | 280/650 |
| 5,358,263 | 10/1994 | Aldus et al. | 280/42 |
| 5,364,119 | 11/1994 | Leu | 280/647 |
| 5,375,869 | 12/1994 | Hsiao | 280/648 |
| 5,468,009 | 11/1995 | Eyman et al. | 280/650 |
| 5,478,102 | 12/1995 | Haung | 280/642 |
| 5,480,179 | 1/1996 | Peacock | 280/650 |
| 5,516,142 | 5/1996 | Hartan | 280/642 |
| 5,522,614 | 6/1996 | Eyman et al. | 280/642 |
| 5,536,033 | 7/1996 | Hinkston | 280/642 |
| 5,593,173 | 1/1997 | Williamson | 280/642 |
| 5,593,174 | 1/1997 | Graziano . | |
| 5,595,393 | 1/1997 | Battan | 280/30 |
| 5,669,623 | 9/1997 | Onishi | 280/642 |
| 5,683,096 | 11/1997 | Zonka | 280/642 |
| 5,769,431 | 6/1998 | Cordova | 280/1.5 |
| 5,779,386 | 7/1998 | Eichhorn | 403/329 |
| 5,845,924 | 12/1998 | Huang | 280/642 |

FOREIGN PATENT DOCUMENTS

| | | |
|---|---|---|
| 2 323 563 | 9/1975 | France . |
| 41 35 322 | 4/1993 | Germany . |

*Primary Examiner*—Lanna Mai
*Assistant Examiner*—Bridget Avery
*Attorney, Agent, or Firm*—Morgan, Lewis & Bockius LLP; C. Scott Talbot; James L. Reed

[57] ABSTRACT

A removable front wheel assembly for a stroller is provided that is able to be disassembled from the stroller frame for shipment and assembled by the consumer upon receipt for use. The invention has applicability to any stroller configuration where, in the stroller's folded configuration, the front wheel assembly includes the outer-most structure of the stroller which defines at least one dimension for the shipping cube of the stroller. The front wheel assembly, which includes the stroller's wheels, lower front leg tubes, framing support structure, and a footrest, if provided, is joined to the stroller frame at a location external to an outer-most frame structure hinge point so as to reduce the complexity of the task of assembling the stroller for the consumer. A swaged joint and connector is utilized to connect the lower front leg tubes of the front wheel assembly to the upper front leg tubes of the stroller's frame.

12 Claims, 10 Drawing Sheets

CONSUMER ASSEMBLED STROLLER FRONT WHEEL ASSEMBLY

BACKGROUND OF THE INVENTION

The invention relates to a stroller that has a front wheel assembly that can be assembled by a consumer. More specifically, the stroller's front wheel assembly can be detached from the stroller frame for shipment and then assembled by the consumer upon receipt for use.

Children's strollers typically have structural frames that can be collapsed from a deployed, or use, configuration to a more compact, storage configuration. In the storage configuration, the extremities of the stroller can define a substantial volume. Strollers are packaged for shipment, distribution, and sale in the storage configuration. Since the cost of the packaging material, shipping, warehousing, etc. is related to the package volume, it is desirable to reduce the package volume. Accordingly, it has become common to package strollers partially disassembled, so that the stroller components require less volume than the assembled stroller. The end user, or consumer, assembles the stroller after removing the components from the package.

Taiwan Patent Publication No. 168064 discloses a stroller that is shipped in a partly disassembled configuration and which is assembled by the consumer for use. The patent publication discloses several parts which may be removed from the stroller frame for reducing the shipping volume of the stroller in order to reduce costs. The parts of the stroller that can be disassembled for shipment and then assembled by the consumer for use after receipt are the push handle, the front castors, a rear wheel assembly, and a storage basket.

U.S. Pat. No. 4,903,980 to Schwartz discloses a connector for connecting component sub-assemblies to a stroller frame in order to provide for ease in removing the sub-assemblies should they require repair. The sub-assemblies that are disclosed for interconnection to the frame are front castors, the handle assembly, and the front gate.

U.S. Pat. No. 4,953,880 to Sudakoff et al. generally discloses a three wheel stroller that contains interconnectable frame segments that permit the stroller to be disassembled by the user to provide for a compact configuration for storage. The patent discloses that an infant support frame segment, a front fork segment, and rear axle segments are capable of disassembly and assembly by the user.

Whereas the Taiwan patent publication discloses disassembly of components from a stroller frame to reduce package volume, the disclosure related to removable wheels only provides for the removal of the front and rear wheels themselves and the rear axle assembly. Typically, and as in the Taiwan patent publication and the '980 patent, where the front wheels and the rear wheels/rear axle assembly are removable from the stroller frame, the wheels/axle assembly are part of an integrally formed castor or connector where the castor or connector is merely fitted onto the stroller's frame. Removal of the wheels/axle assembly from the stroller's frame by disconnecting the castor or connector provides for a reduction in the package volume for some stroller configurations. However, in many stroller configurations, the outer-most structure of the stroller in one dimension is defined by framing structure associated with the front wheels and not solely by the wheels themselves, so that removal of the wheels and/or axle assembly does not result in a reduction for this dimension. Consequently, this dimension's effect on the package volume required for the container is unchanged by removal of the wheels and/or axle assembly alone. In these stroller configurations, where the front wheel assembly defines the outer-most structure of the stroller in one dimension, package volume reductions can only be obtained in this dimension by removing the front wheel assembly, which includes all framing structure associated with the front wheels that contributes to defining this dimension.

The framing structures that can be associated with the front wheels, and thus comprise the component of the front wheel assembly that defines one dimension of the package volume for the stroller, are the stroller's lower front leg tubes and a footrest, if provided, that is attached to the lower front leg tubes. In the present invention, the front wheel assembly, which includes the front leg tubes and optional footrest, and not just the wheels themselves, is removed from the stroller's frame in order to reduce the package volume of the stroller.

The '880 patent discloses frame assemblies that can be disassembled from, and assembled to, a stroller's frame in order to provide for ease of storage of the stroller. The stroller disclosed in the '880 patent is comprised of a simple frame structure that contains few hinged joints. Disassembly of the frame structure as disclosed in the '880 patent for the stroller frame configuration disclosed is a relatively simple task. However, disassembly as taught by the '880 patent is limited in application to this particular, simple frame structure. For stroller configurations where multiple hinged joints are required, disassembly/assembly of the stroller frame at locations between major frame-fold linking points (i.e. within the main body of the stroller rather than at frame locations outside the frame-fold linking points), as taught by the '880 patent, would add prohibitively to the complexity of the task of assembling the stroller for the consumer and is not feasible. Disassembly of the stroller at locations as taught by the '880 patent is only feasible in the most basic of stroller frame configurations and cannot be reliably accomplished by a consumer in stroller configurations where multiple hinged joints are provided.

Therefore, based on the inapplicability of the known techniques for reducing the shipping volume of a stroller, in stroller configurations where, when the stroller is folded for shipment, the front wheel assembly is the stroller's outer-most structure that defines at least one dimension for the package volume of the stroller, it would be advantageous to remove the front wheel assembly from the frame of the stroller in order to provide for a reduced package volume for the now disassembled, folded stroller. This front wheel assembly disassembly/assembly occurs at a location on the frame such that the complexity of the task of disassembly/assembly of the front wheel assembly for the consumer is minimized.

SUMMARY OF THE INVENTION

The drawbacks and limitations of removable frame components in the prior art are overcome by the removable stroller front wheel assembly of the present invention. In order to reduce the cubic volume of the packaging for strollers, and thus in-turn reduce packaging, shipping, warehousing, and other related costs, a removable front wheel assembly for a stroller is provided that is able to be disassembled from the stroller frame for shipment and assembled by the stroller's end user, or the consumer, upon receipt for use. The invention has applicability to any stroller configuration where, in the stroller's folded configuration, the front wheel assembly comprises the outer-most structure of the stroller that defines at least one dimension for the package volume of the stroller.

The front wheel assembly, which is comprised of the stroller's wheels, lower front leg tubes and a footrest, if provided, is joined to the stroller frame at a location external to an outer-most frame structure hinge point so as to reduce the complexity of the task of assembling the stroller for the consumer. A swaged joint is utilized to connect the lower front leg tubes of the front wheel assembly to the upper front leg tubes of the stroller's frame. The swaged joint is comprised of one end of a framing tube (either associated with the upper front legs or the lower front legs) being necked down to an outer diameter slightly smaller than the inner diameter of the framing tube that it is to be mated with upon assembly by the consumer. Once the tubes are joined, a fastener (e.g. a spring-biased button or self-tapping screw) can be used to secure the mated frame segments together. The present invention is disclosed in the context of two different, exemplary stroller configurations, namely a four wheel stroller and a three wheel stroller, however, the invention is not limited to these particular embodiments.

DETAILED DESCRIPTION

Figure 1:
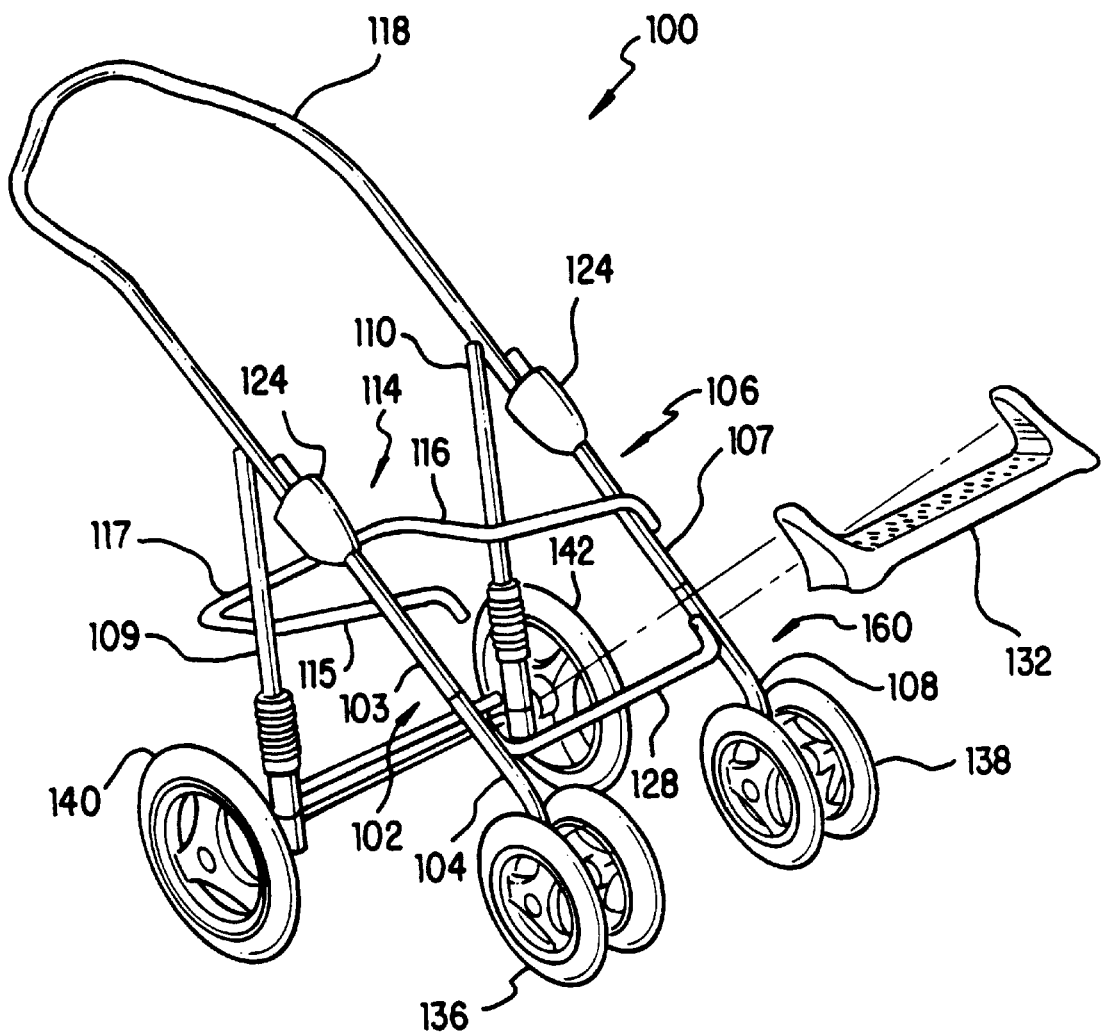
FIG. 1 is a perspective view of one embodiment of a stroller that incorporates a consumer assembled front wheel assembly.
Figure 2:
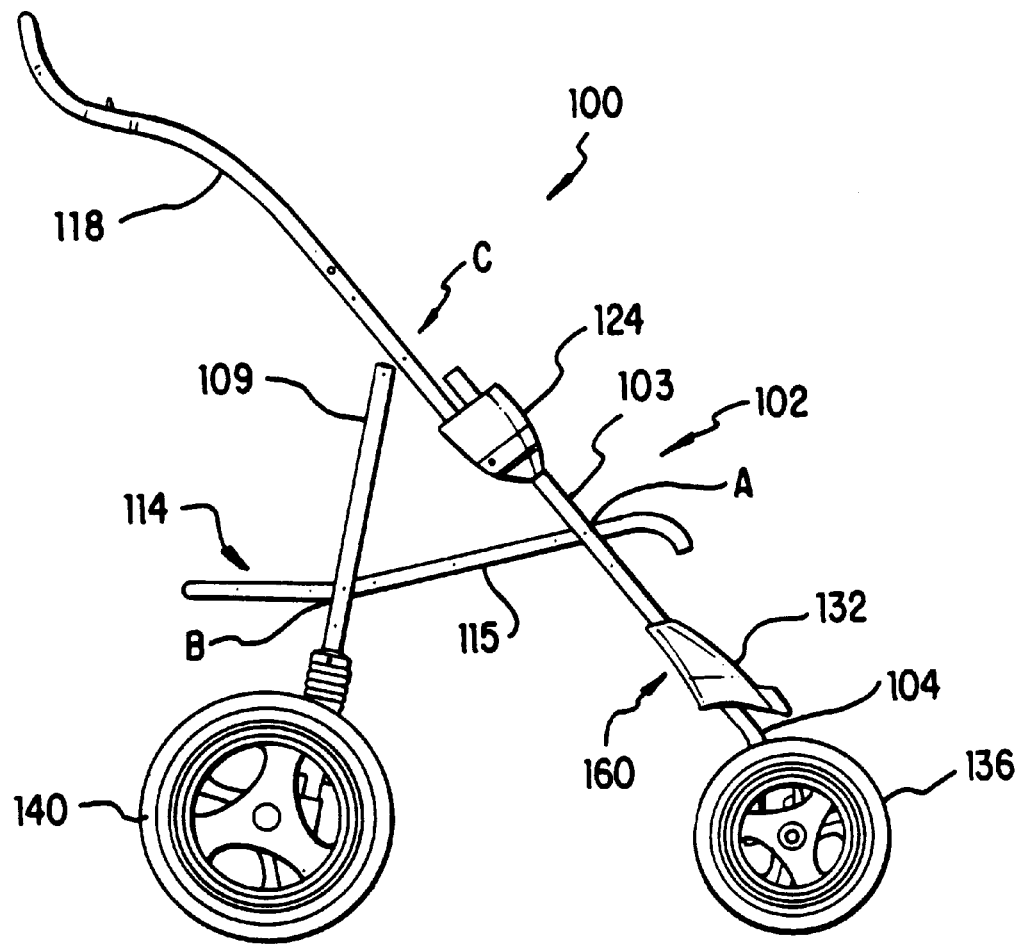
FIG. 2 is a right side elevational view of the stroller of FIG. 1.

A first embodiment of the removable front wheel assembly of the present invention is illustrated in the stroller frame configuration shown in FIGS. 1 and 2. For clarity of illustration, only the primary frame components are shown—soft goods and secondary frame components (such as plastic moldings that couple the frame components) are omitted. Stroller 100 is comprised of a pair of right and left front legs 102, 106 respectively, right and left rear legs 109, 110, respectively, a seat frame member 114, handle 118, coupling mechanism 124, optional footrest 132, and wheels 136, 138, 140, 142. Optional footrest 132 is shown in an exploded configuration in FIG. 1. The front, lower frame of stroller 100 incorporates removable front wheel assembly 160. All framing support members, namely the front and rear legs, seat frame, and handle are comprised of metal tubing.

Handle 118 is pivotally coupled to rear legs 109, 110 (by a coupling not shown). Handle 118 is also pivotally coupled to front legs 102, 106 by coupling mechanism 124. Separate pivot joints and coupling mechanisms are provided for attachment of handle 118 to right and left rear and front legs, respectively. Seat frame member 114 is comprised of integrally formed right and left seat frame side members 115, 116 and seat frame connecting member 117. Right and left seat frame side members 115, 116 extend parallel to each other from the rear of stroller 100, where they are interconnected by seat frame connecting member 117, to the front end of stroller 100 where their distal ends extend forward of front legs 102, 106. Right and left seat frame side members 115, 116 are pivotally connected to right and left rear legs 109, 110 and right and left front legs 102, 106, respectively.

Hinge points A, B, and C, as shown in FIG. 2, define the outer-most frame structure linking points for stroller 100. Hinge point A is the pivotal connection between seat frame 114 and front legs 102, 106, hinge point B is the pivotal connection between seat frame 114 and rear legs 109, 110, and hinge point C is the pivotal connection between handle 118 and rear legs 109, 110. The frame of the stroller within the area defined by pivotal connections A, B, and C is referred to herein as the core frame structure of stroller 100.

Right and left front legs 102, 106, respectively, are comprised of right and left upper leg tubes 103, 107 and lower leg tubes 104, 108, respectively. Transverse support member 128 extends between lower leg tubes 104, 108 to provide support to this lower framing structure. The upper leg tubes are joined with the lower leg tubes to form the front leg tubes for stroller 100. Both the right and left front legs are constructed in a similar manner and therefore, a description for the right front leg only will be provided.

Figure 3:
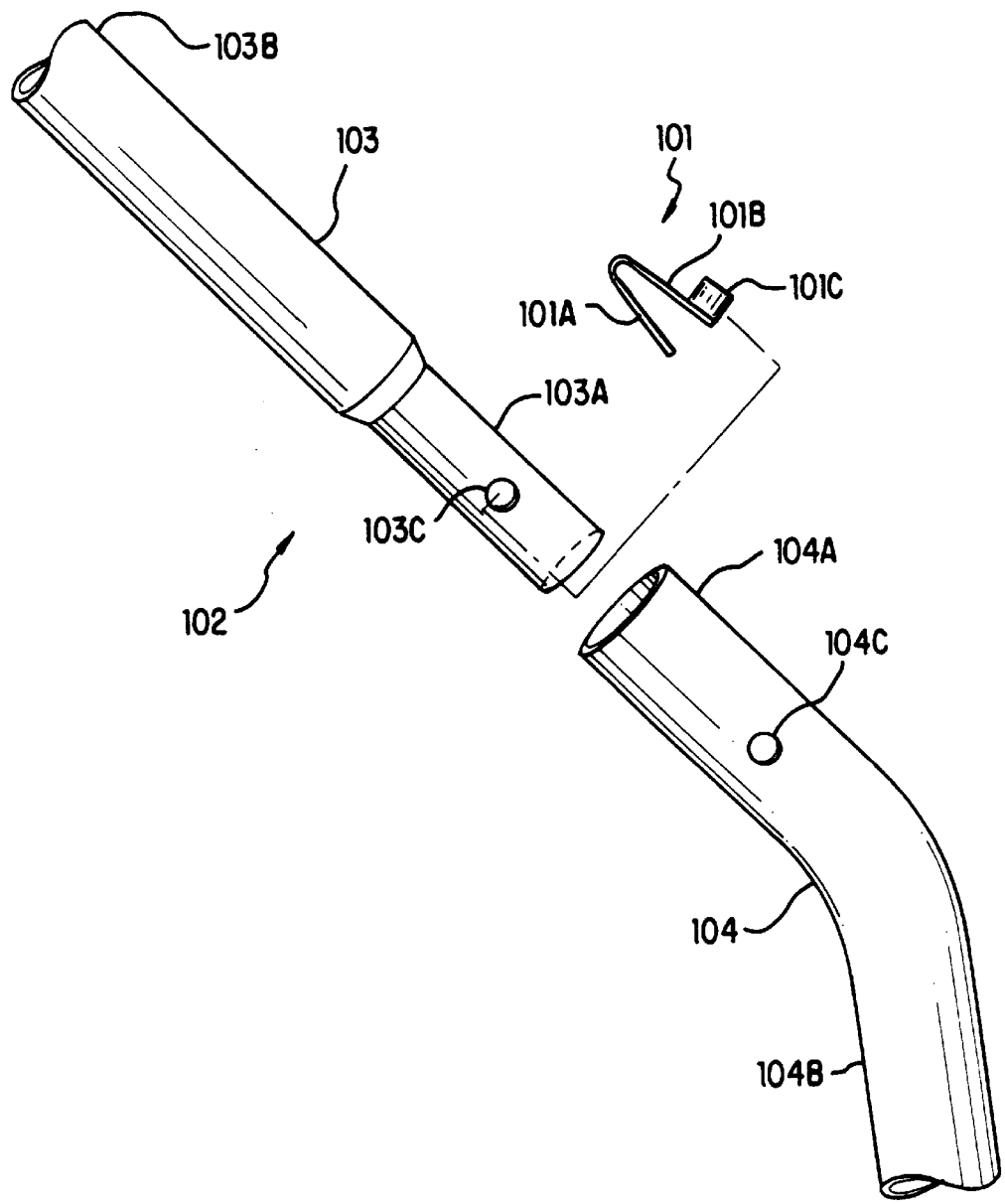
FIG. 3 is an exploded perspective view of the upper and lower front leg tubes of the stroller of FIG. 1.

Right front leg 102 includes upper leg tube 103 and lower leg tube 104. As shown in FIG. 3, upper leg tube 103 is a straight tube with a swaged end 103A and an end 103B of constant diameter. Upper leg tube 103 is pivotally connected to the stroller frame through coupling mechanism 124 and at hinge point A to provide for folding of the stroller. Upper leg tube 103 has a predetermined length outboard of hinge point A. Lower leg tube 104 has a length that is at least a substantial fraction of the length of upper leg tube 103. Swaged end 103A of upper leg tube 103 is formed to be received within end 104A of lower leg tube 104. As such, the outer diameter of swaged end 103A is sized to be slightly smaller than the inner diameter of end 104A of lower leg tube 104 so that swaged end 103A is snugly received within end 104A. Upper leg tube 103 and lower leg tube 104 are joined at a position on the stroller frame exterior to hinge point A.

In order to secure upper leg tube 103 to lower leg tube 104, swaged end 103A contains a connection member or spring-biased retention member 101 within it. Engagement member 101A of retention member 101 rests against the inner wall of upper leg tube 103. Button 101C of spring-biased retention member 101 is mounted on interconnection member 101B and is biased through aperture 103C in swaged end 103A of upper front leg tube 103. Upon commencement of inserting swaged end 103A into end 104A of lower leg tube 104, the person assembling the front leg tubes depresses button 101 C into swaged end 103A by applying a force to button 101C sufficient to overcome the biasing force of spring-biased retention member 101 and maintains button 101C in the depressed position while swaged end 103A with smaller outside diameter is inserted into end 104A of lower leg tube 104 with larger inside diameter. As swaged end 103A continues to be inserted into end 104A, apertures 103C and 104C will align and button 101C will be biased into an extended position where it protrudes through apertures 103C, 104C, thus locking upper leg tube 103 and lower leg tube 104 together. To disassemble the lower leg tubes from the upper leg tubes, button 101C is depressed into apertures 103C, 104C until it is fully displaced from the apertures. When button 101C is fully displaced from the apertures, the lower leg tube can be disassembled from the upper leg tube by removing the lower leg tube from the swaged end of the upper leg tube.

Lower leg tube 104 is bent such that the centerline of end 104A is positioned approximately 140° clockwise from the longitudinal centerline of end 104B. Lower leg tube 104 is shaped in this manner so that when end 104A is joined with upper leg tube 103, end 104B of lower leg tube 104 is positioned approximately perpendicular to the surface upon which stroller 100 is resting when in its unfolded configuration. This perpendicular positioning is required in order to ensure that the weight of the stroller is applied in as near a vertical direction as possible to the lightweight, removable castors which are attached to the lower front leg tubes. The connection joint between the lower front legs and the lightweight, removable castors is able to sustain vertical forces to a much greater extent than it is able to sustain forces normal to the joint. Additionally, the lower leg tubes are configured as such so that the front castors are positioned in a proper orientation with respect to the lower leg tube and the ground surface for operation.

As seen in FIGS. 1 and 2, optional footrest 132 is attached to lower front leg tubes 104, 108. Footrest 132 is preferably comprised of molded plastic and has a horizontal portion which extends between lower front leg tubes 104, 108 and two side portions which extend generally vertically. The horizontal portion supports the feet of an occupant of the stroller and each vertical portion contains an opening for receiving the upper and lower front leg tubes within it. Footrest 132 is attached to lower front leg tubes 104, 108 at a position such that the joint between upper front leg tubes 103, 107 and lower front leg tubes 104, 108 is contained within the vertical portion of footrest 132.

Front wheel assembly 160 is comprised of lower front leg tubes 104, 108, transverse support member 128, optional footrest 132 and front wheels 136, 138. Front wheel assembly 160 is able to be assembled to the stroller and disassembled from the stroller by the joint connecting upper front leg tubes 103, 107 and lower front leg tubes 104, 108. Front wheel assembly 160 is connected to the stroller frame at a position external to outer-most frame structure hinge point A of stroller 100. Additionally, by using conventional means that are well-known in the art, such as removable castors, front wheels 136, 138 are removable from front wheel assembly 160. Additionally, rear wheels 140, 142 are assembleable with the stroller frame.

Figure 4:
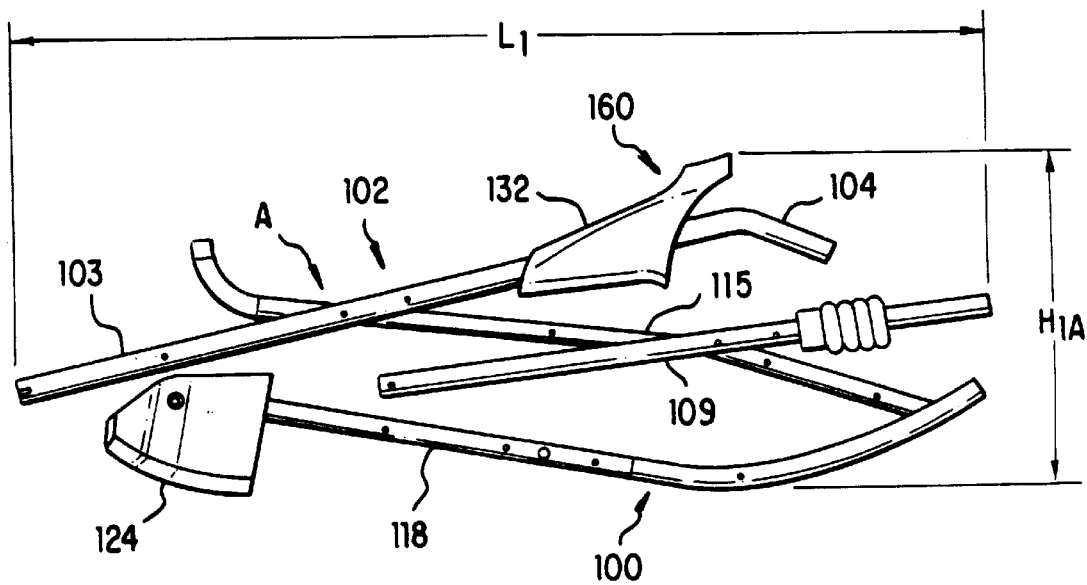
FIG. 4 is a right side elevational view of the stroller of FIG. 1 in a folded configuration with the front wheel assembly assembled to the stroller.

As can be seen in FIG. 4, stroller 100, in its folded configuration with front and rear wheels removed, defines a package volume with height and length dimensions of $H_{1A}$ and $L_1$, respectively, which can be viewed as a theoretical rectangular parallelepiped that is defined by the folded stroller. As can be seen, the height dimension is defined by the distance between, at one end, the outer-most extension of coupling mechanism 124 and handle 118, and at another end, the outer-most extension of front wheel assembly 160, which in this configuration is defined by footrest 132. Dimension $L_1$ is defined by the distance between, at one end, the outer-most extension of right rear leg tube 109, and at another end, the outer-most extension of right upper front leg tube 103.

Figure 5:
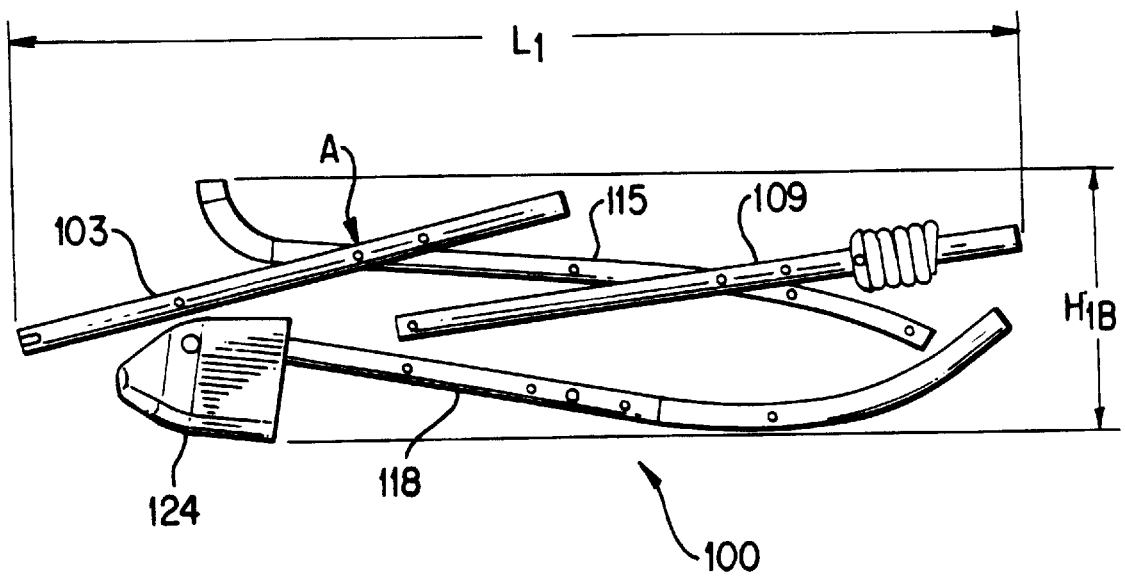
FIG. 5 is a right side elevational view of the stroller of FIG. 1 in a folded configuration with the front wheel assembly disassembled from the stroller.

FIG. 5 shows stroller 100 in its folded configuration with front wheel assembly 160 removed. Front wheel assembly 160 is coupleable to the stroller frame at a position external to outer-most frame structure hinge point A. Lower front leg tubes 104, 108, and consequently front wheel assembly 160, are able to be assembled to upper front leg tubes 103, 107 by coupling lower front leg tubes 104, 108 to upper front leg tubes 103, 107. Front wheel assembly 160, when separate from the stroller frame, is able to be fitted within the package for shipment.

As seen in FIG. 5, by removing front wheel assembly 160, the height dimension for the stroller's package has been reduced from distance $H_{1A}$ to $H_{1B}$. Formerly, as shown in FIG. 4, front wheel assembly 160 defined the height dimension of the package. FIG. 5 shows that with front wheel assembly 160 removed, the frame structure that now defines the height dimension of the package at the end where previously front wheel assembly 160 defined the dimension, is now the outer-most extension of right seat frame side member 115. The outer-most extension of coupling mechanism 124 and handle 118 still defines the height dimension at the opposite end. Length dimension $L_1$ remains unchanged.

Even if optional footrest 132 was not attached to front wheel assembly 160, lower front leg tube 104 would be the frame structure of front wheel assembly 160 that would define the height dimension for the stroller package. Removal of front wheel assembly 160, even without footrest 132 attached, would still result in a reduced package volume for stroller 100.

This reduction in volume is significant. The critical dimensions for a package are its length, width, and height. In attempting to reduce the size of the package, it is most advantageous to reduce the dimension that has the maximum effect on the volume of the package. In an exemplary package with length, width and height dimensions of 35"×18"×10", reducing the length by 1" results in a 2.9% reduction in package volume, reducing the width by 1" results in a 5.6% reduction, and reducing the height by 1" results in a 10% reduction. One of the most significant costs associated with a stroller can be shipping cost, which, for surface shipment, is proportional to package volume. Thus, 10% reduction in package volume produces a 10% reduction in shipping costs. Therefore, a reduction in the height dimension of the package will be most advantageous in reducing the total volume of the package. Through the front wheel assembly of the present invention, the critical dimension for decreasing the volume of the package has been reduced, resulting in substantial savings in shipping costs.

In stroller configurations such as the present embodiment where the front wheel assembly defines the outer-most structure of the stroller in the height dimension for the package, reductions in this dimension, cumulative to those obtained by merely removing the front wheels, can be obtained by removing the entire front wheel assembly, which includes the framing structure associated with the front wheels that contributes to defining this dimension.

Three Wheel Stroller Configuration

Figure 6:
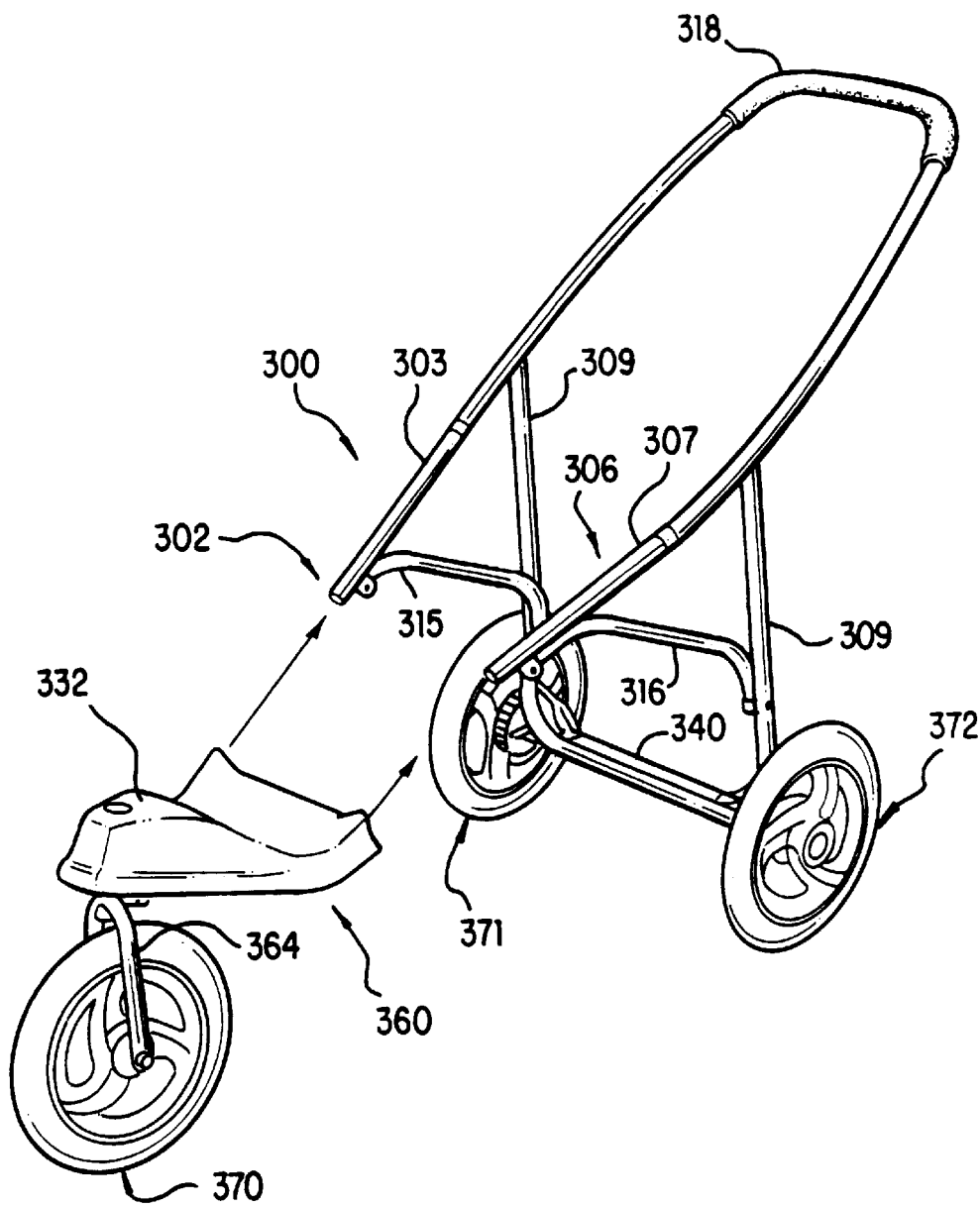
FIG. 6 is a perspective view of a second embodiment of a stroller that incorporates a consumer assembled front wheel assembly.

A second example of the use of the removable front wheel assembly of the present invention is shown in FIG. 6. FIG. 6 shows a three wheel stroller 300 with a removable front wheel assembly 360.

Figure 8:
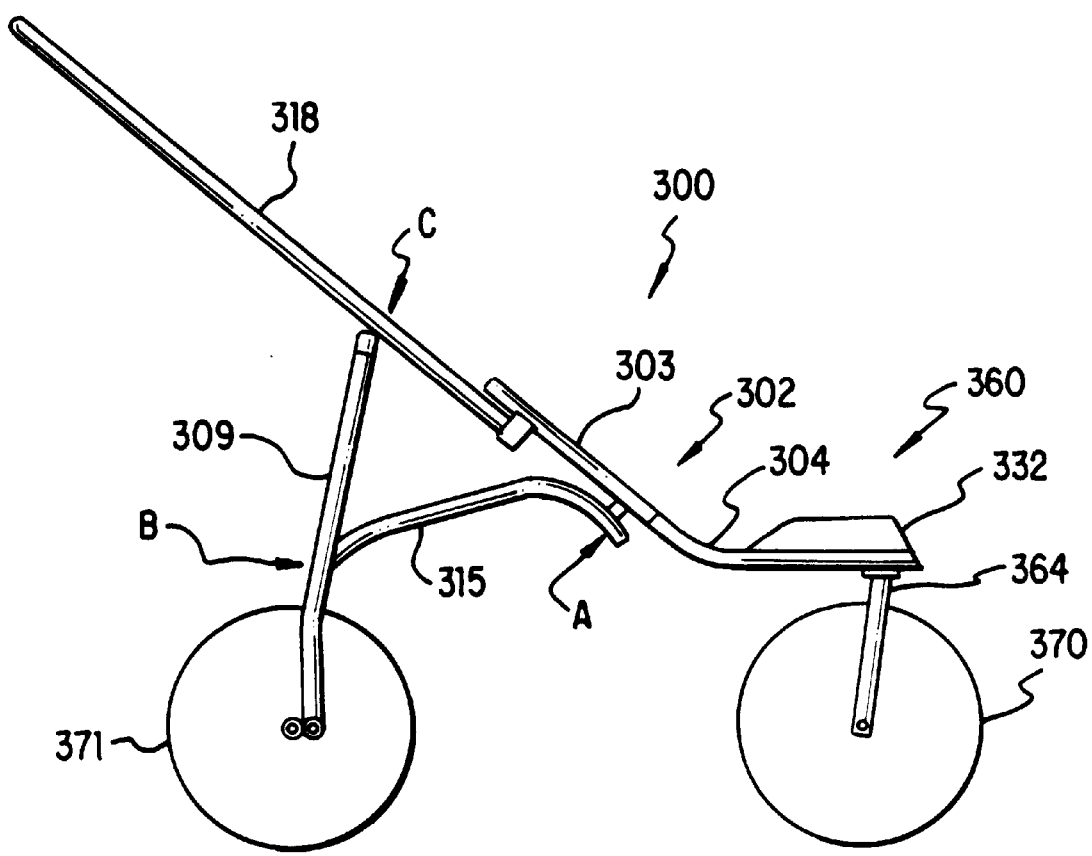
FIG. 8 is a right side elevational view of the stroller of FIG. 6.

As shown in FIGS. 6 and 8, three wheel stroller 300 generally comprises a foldable frame including a handle tube 318, right and left front leg tubes 302, 306, respectively, rear support tube 309 and right and left seat tubes 315, 316. Right and left front leg tubes 302, 306 include right and left upper front leg tubes 303, 307 and right and left lower front leg tubes 304, 308 respectively. Two rear wheels 371, 372 are removably mounted to rear axle 340.

Handle tube 318 is pivotally connected at its lower ends to right and left front leg tubes 302, 306 and is also pivotally mounted to rear tube 309. Right and left seat tubes 315, 316 are pivotally mounted to front leg tubes 302, 306 at a forward end and are pivotally mounted at their rear ends to rear tube 309.

Hinge points A, B, and C, as shown in FIG. 8, define the outer-most frame structure linking points for stroller 300. Hinge point A is the pivotal connection between seat tubes 315, 316 and front legs 302, 306, hinge point B is the pivotal connection between seat tubes 315, 316 and rear tube 309, and hinge point C is the pivotal connection between handle 318 and rear tube 309. The frame of the stroller within the area defined by pivotal connections A, B, and C is the core frame structure of stroller 300.

The front, lower frame of stroller 300 is comprised of front wheel assembly 360. Front wheel assembly 360 is comprised of lower front leg tubes 304, 308, front fork 364 and front wheel 370. A footrest 332 may also be provided which also serves as a fender and a fairing over front wheel 370. Footrest 332, if provided, is mounted to lower front leg tubes 304, 308 over front wheel 370 as shown.

Figure 7:
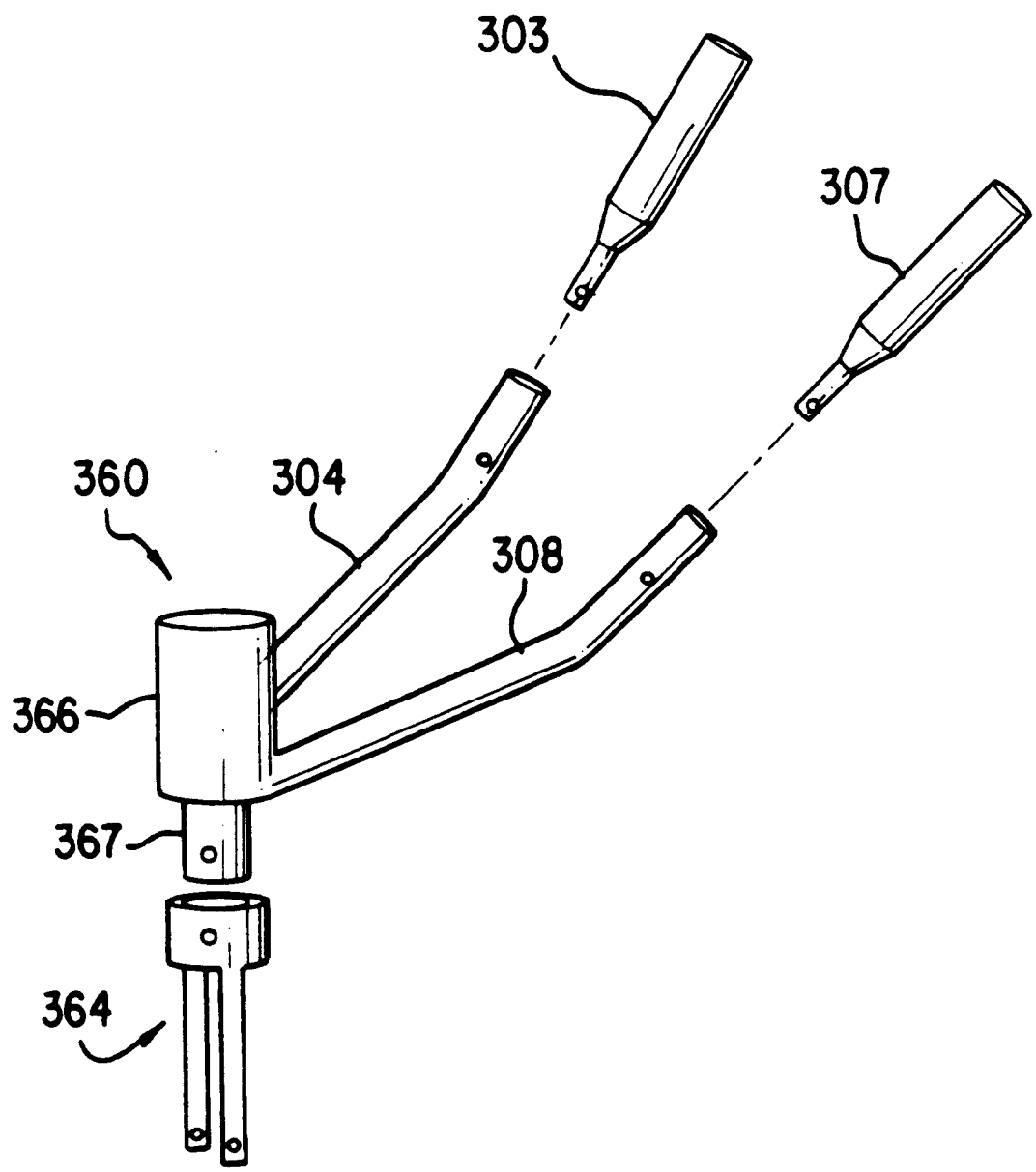
FIG. 7 is an exploded perspective view of the upper and lower front leg tubes of the stroller of FIG. 6.

As shown in FIG. 7, lower front leg tubes 304, 308 have their vertex at a nearly vertical head tube 366 which has a conventional headset assembly for mounting fork 364 to fork shaft 367 so that fork 364 may pivot about the longitudinal axis of the head tube. Fork 364 is removably mounted to fork shaft 367 by a conventional nut and bolt. Front wheel 370 is removably mounted to fork 364. As can also be seen in FIG. 7, front wheel assembly 360 may be disassembled from the frame of stroller 300 by disconnecting lower front leg tubes 304, 308 from upper front leg tubes 303, 307. The lower front leg tubes and upper front leg tubes are connected by utilizing the same connection means of swaged tubes and a spring-biased connection member as described earlier in this specification in the context of stroller 100 and as shown in FIG. 3. Front wheel assembly 360 is removable from the stroller at a position on the stroller frame exterior to hinge point A.

Figure 9:
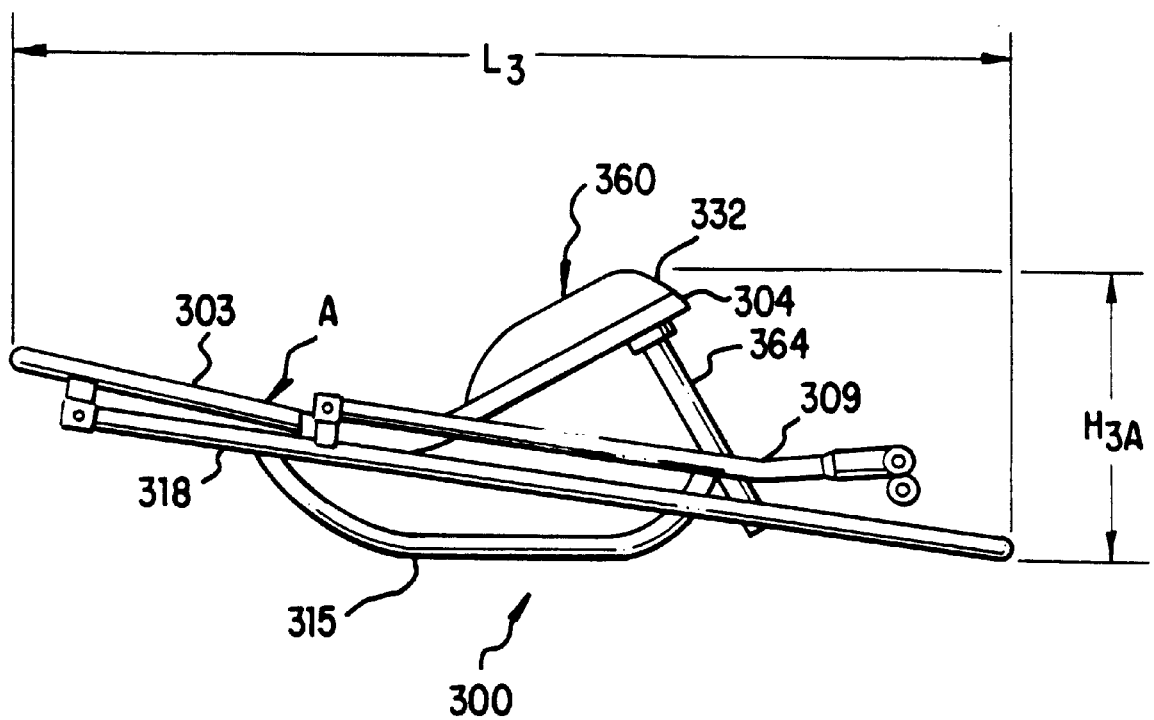
FIG. 9 is a right side elevational view of the stroller of FIG. 6 in a folded configuration with the front wheel assembly assembled to the stroller.

FIG. 9 shows stroller 300 in its folded configuration, with rear wheels 371, 372 and front wheel 370 removed, defining a package with height and length dimensions of $H_{3A}$ and $L_3$, respectively. As can be seen, all frame members are positioned nearly parallel with one another with the exception of front wheel assembly 360. The height dimension for the strollers package is defined by the distance between, at one end, the outer-most extensions of seat tube 315 and handle tube 318, and at another end, the outer-most extension of front wheel assembly 360, which in this configuration is defined by footrest 332. Dimension $L_3$ is defined by the distance between the outer-most extension of handle 318 and upper front leg tube 303.

Figure 10:
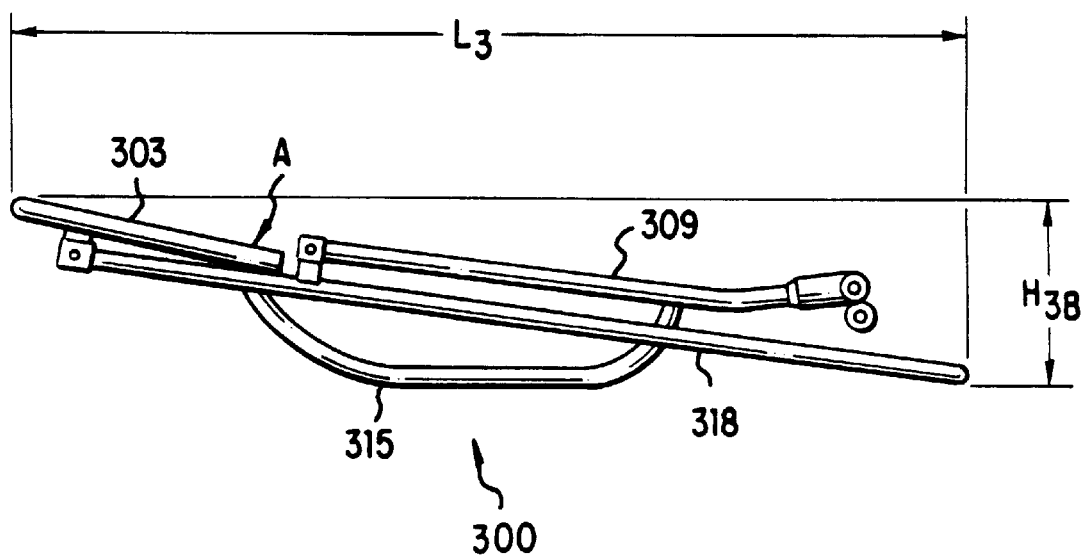
FIG. 10 is a right side elevational view of the stroller of FIG. 6 in a folded configuration with the front wheel assembly disassembled from the stroller.

FIG. 10 shows stroller 300 in its folded configuration with front wheel assembly 360 removed. Front wheel assembly 360 is removed from the stroller frame at a position external to outer-most frame structure hinge point A. As seen in FIG. 10, by removing front wheel assembly 360, the height dimension for the stroller's package has been reduced from distance $H_{3A}$ to $H_{3B}$. Now, the nearly parallel positioned framing members define the height dimension of the package whereas formerly, as shown in FIG. 9, front wheel assembly 360 comprised the frame structure that defined the height dimension of the package. FIG. 10 shows that with front wheel assembly 360 removed, the frame structure that now defines the height dimension of the package at the end where previously front wheel assembly 360 defined the dimension, is the outer-most extension of upper front leg tube 303. The outer-most extension of seat tube 315 and handle 318 still defines the height dimension at the opposite end. Length dimension $L_3$ remains unchanged. Lower front leg tubes 304, 308, fork 364, which is removably mounted to fork shaft 367, and wheels 370, 371, 372 are stowed within the package by placing these components within the core frame structure of the folded stroller.

It can be clearly seen that this reduction in package volume is significant. Even if optional footrest 332 was not attached to front wheel assembly 360, lower front leg tube 304 would be the defining frame structure of front wheel assembly 360 that would define the height dimension for the stroller package. Removal of front wheel assembly 360, even without footrest 332 attached, would still result in a reduced package volume for stroller 300.

Stroller configuration 300 is another embodiment where the outer-most structure of the stroller in one dimension is defined by the front wheel assembly and where package volume reductions in this dimension can be obtained by removing the front wheel assembly. By removing front wheel assembly 360 from the stroller frame, a nearly 50% reduction in the height dimension of the package is achieved and a commensurate 50% reduction in the package volume is obtained with the present invention.

Several variations on the disclosed embodiment are contemplated. The present invention has been described in the context of two stroller embodiments, however, the present invention has applicability to any stroller frame configuration where, when the stroller is in its folded configuration, the front wheel assembly is the outer-most structure for one dimension of the shipping cube. Additionally, the present invention, as described in the two stroller embodiments discussed herein, results in a reduction in the height dimension of the stroller package, however, the invention can be utilized in stroller configurations where the front wheel assembly defines any of the dimensions of the package. In stroller configurations where the front wheel assembly defines the length, or even possibly the width dimension, of the stroller in its folded configuration, removing the front wheel assembly as disclosed will reduce the stroller's package volume.

The present invention utilizes swaged tubes and a spring-biased member to join the front wheel assembly to the stroller frame, however, other connection means are possible. For example, a fitting could be provided to interconnect the front wheel assembly to the stroller frame. Additionally, self-tapping screws could be utilized to secure both the swaged-tube connections and the fitting connections.

What is claimed is:

1. A stroller comprising:
   a collapsible frame having a plurality of frame members hingedly coupled together for movement between a deployed configuration and a folded configuration, including first and second upper front legs and a handle coupled to and rotatably moveable with respect to said first and second upper front legs; and
   first and second lower front legs coupleable at a first, proximal end thereof to said first and second upper front legs, respectively, and having a second, distal end,
   said stroller being containable within a first theoretical rectangular parallelepiped when disposed in said folded configuration with said lower front legs coupled to said upper front legs, said first parallelepiped having a first height dimension defined in part by a portion of said lower front legs, said stroller further being containable within a second theoretical rectangular parallelepiped when disposed in said folded configuration with said lower front legs separated from said upper front legs, said second parallelepiped having a second height dimension smaller than said first height dimension.

2. The stroller of claim 1 further comprising first means for coupling said first lower front leg to said first upper front leg.

3. The stroller of claim 2 wherein said first coupling means comprises a swaged joint and a connector.

4. The stroller of claim 3 wherein:

said connector is a spring-biased button and said swaged joint includes apertures in each of said first upper front leg and said first lower front leg in which said button is receivable.

5. The stroller of claim 3 wherein:

said connector is a self-tapping screw.

6. The stroller of claim 1, further comprising a first caster wheel assembly coupleable to said first and second lower front legs.

7. The stroller of claim 6, further comprising a second caster wheel assembly, wherein said first caster wheel assembly is coupleable to said first lower leg and said second caster wheel assembly is coupleable to said second lower leg.

8. The stroller of claim 1, further comprising a transverse member coupling said first lower front leg and said second lower front leg.

9. The stroller of claim 8, further comprising a footrest disposable on said transverse frame member.

10. The stroller of claim 1, further comprising first and second rear legs coupled to and moveable with respect to said first and second upper front legs.

11. The stroller of claim 10, further comprising first and second rear wheels coupleable to said first and second rear legs, respectively.

12. The Stroller of claim 10, wherein said first and second rear legs are coupled to and rotatably moveable with respect to said handle.

* * * * *